(12) United States Patent
Ni et al.

(10) Patent No.: US 11,842,174 B2
(45) Date of Patent: Dec. 12, 2023

(54) TRANSLATING BETWEEN PROGRAMMING LANGUAGES USING MACHINE LEARNING

(71) Applicant: GOOGLE LLC, Mountain View, CA (US)

(72) Inventors: Bin Ni, Fremont, CA (US); Zhiqiang Yuan, San Jose, CA (US); Qianyu Zhang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 615 days.

(21) Appl. No.: 16/506,161

(22) Filed: Jul. 9, 2019

(65) Prior Publication Data

US 2021/0011694 A1    Jan. 14, 2021

(51) Int. Cl.
| | | |
|---|---|---|
| *G06N 5/04* | (2023.01) | |
| *G16H 50/20* | (2018.01) | |
| *G06F 8/41* | (2018.01) | |
| *G06N 20/00* | (2019.01) | |

(52) U.S. Cl.
CPC ............... *G06F 8/41* (2013.01); *G06N 20/00* (2019.01)

(58) Field of Classification Search
CPC . G06F 8/41; G06N 20/00; G06N 5/04; G06N 7/005; G16H 50/20; G06K 9/6256
See application file for complete search history.

(56) References Cited

U.S. PATENT DOCUMENTS

| | | | |
|---|---|---|---|
| 7,779,396 B2 | 8/2010 | Meijer et al. | |
| 7,861,226 B1* | 12/2010 | Episkopos | G06F 11/3696 717/124 |
| 7,921,416 B2 | 4/2011 | Fontoura et al. | |
| 8,332,828 B2 | 12/2012 | Vargas | |
| 8,806,452 B2 | 8/2014 | Dhoolia et al. | |
| 9,530,016 B1* | 12/2016 | Pomerantz | G06F 21/566 |
| 9,971,581 B1 | 5/2018 | Nandanuru et al. | |
| 2006/0064680 A1* | 3/2006 | Devane | G06F 8/41 717/140 |
| 2012/0096444 A1* | 4/2012 | Wright | G06F 8/433 717/137 |
| 2017/0046137 A1* | 2/2017 | Grimmer | G06F 8/51 |
| 2020/0137001 A1* | 4/2020 | Wu | G06F 40/216 |
| 2020/0372694 A1* | 11/2020 | Hwang | G06N 20/00 |
| 2021/0004210 A1* | 1/2021 | Evangelopoulos | G06F 8/72 |

OTHER PUBLICATIONS (Katz et al., "Using Recurrent Neural Networks for Decompilation", 2018) (Year: 2018).*

(Continued)

*Primary Examiner* — Chat C Do
*Assistant Examiner* — Noor Alkhateeb
(74) *Attorney, Agent, or Firm* — Gray Ice Higdon

(57) ABSTRACT

Techniques are described herein for translating source code in one programming language to source code in another programming language using machine learning. In various implementations, one or more components of one or more generative adversarial networks, such as a generator machine learning model, may be trained to generate "synthetically-naturalistic" source code that can be used as a translation of source code in an unfamiliar language. In some implementations, a discriminator machine learning model may be employed to aid in training the generator machine learning model, e.g., by being trained to discriminate between human-generated ("genuine") and machine-generated ("synthetic") source code.

19 Claims, 6 Drawing Sheets

(56) References Cited

OTHER PUBLICATIONS (Wang et al., "Learning to Encode Text as Human-Readable Summaries using Generative Adversarial Networks", Oct. 2018) (Year: 2018).*
"Spices .Net Decompiler", Jun. 14, 2019 (Year: 2019).*
Gu, Xiaodong et al. DeepAM: APIs with Multi-Modal Sequence to Sequence Learning; IJCAI; pp. 3675-3681; Apr. 25, 2017.
Xie, J. et al. Learning Dynamic Generator Model by Alternating Back-Propagation Through Time; 10 pages; 2019.
Zhong, H. et al. Mining API Mapping for Language Migration. In Proceedings of the 32nd ACM/IEEE International Conference on Software Engineering—vol. 1; pp. 195-204; ACM; May 2010.
Katz, et al.; Using Recurrent Neural Networks for Decompilation; IEEE; pp. 346-356; dated 2018.
Wang, Y. et al., "Learning to Encode Text as Human-Readable Summaries using Generative Adversarial Networks;" Cornell University, arXiv.org, arXiv:1810.02851v1; 14 pages; dated Oct. 5, 2018.
Waters, "Program Translation Via Abstraction and Reimplementation;" IEEE Tansactins on Software Engineering, vol. 14, No. 8; pp. 1207-1220; Aug. 31, 1988.
European Patent Office; International Search Report and Written Opinion of PCT Ser. No. PCT/US2020/041413; 17 pages; dated Oct. 21, 2020.
European Patent Office; Communication pursuant to Article 94(3) EPC issued in Application No. 20750940.7, 10 pages, dated Jul. 17, 2023.

\* cited by examiner

TRANSLATING BETWEEN PROGRAMMING LANGUAGES USING MACHINE LEARNING

BACKGROUND

Computer software programming often requires developers to read and/or write source code (i.e., to program) in a specific language, e.g. Java, C++, C, Python, etc. Each programming language has its own strengths, weaknesses, nuances, idiosyncrasies, etc. Additionally, some programming languages are more suitable for certain stages of software development and/or a software life cycle than others. As one example, scripting languages such as Python, JavaScript, Perl, etc., are often more effectively used near the very beginning of software development because programmers using these languages are able to turn around functional software relatively quickly.

Most programmers obtain at least a superficial understanding of multiple programming languages, but only master a few. Consequently, each programming language tends to have its own talent pool. A talent pool's size is one consideration when entities such as companies select which programming languages will be employed to form their code base. Unfortunately, the boundaries between different programming languages becomes one of the big hurdles to software evolution. As an example, suppose a company's code base is primarily written in a base programming language, but for whatever reason the company decides it needs new code written in a target programming language. The company's existing talent pool is likely more expert with the base programming language than the second. Hiring new programmers trained in the second programming language can be expensive. It is also expensive to train existing employees to program in the target programming language. Replatforming and/or migrating a code base is also a time consuming endeavor, taking time away from software development.

SUMMARY

Techniques are described herein for translating source code in a "base" programming language to source code in another programming language, or "target" programming language, using machine learning. Among other things, this allows programmers who might be unfamiliar with a base programming language to nonetheless view and/or edit source code written in the base language by first translating the source code to another, more familiar programming language.

Various types of machine learning models may be trained to translate between programming languages. In some implementations, one or more generative adversarial networks ("GANs") may be trained, e.g., for translation between one or more different programming languages. In some such implementations, each GAN may be associated with a particular programming language. Each GAN may include a generator that is trained to generate "synthetically-naturalistic" (i.e., human-readable or human-friendly) source code in the target programming language, e.g., based on input indicative of source code in another programming language. Each GAN may also include a discriminator that is trained to discriminate between "genuine" source code written in the target programming language by a human and "synthetic" source code generated by the generator in the target programming language.

The generator and discriminator may be trained jointly (and with little or no supervision), e.g., using both "ground truth" or "human-written" source code snippets and synthetically-naturalistic source code snippets created based on output of the generator. For example, suppose a synthetically-naturalistic source code snippet generated by the generator is deemed by the discriminator to be "genuine," i.e. written by a human. The adversarial loss associated with the discriminator's output may reflect that the discriminator was "fooled" by the generator, and the discriminator may be trained accordingly. As another example, suppose a synthetically-naturalistic source code snippet generated by the generator is deemed by the discriminator to be "synthetic," i.e. generated by the generator. The adversarial loss associated with the discriminator's output may reflect that the discriminator was not "fooled" by the generator, and the generator may be trained based on this adversarial loss. In various implementations herein, discriminators and/or generators may be trained using techniques such as back propagation and gradient descent, to name a few.

When setting out to train GAN(s) to facilitate translation between base and target programming languages, there might not always (or even often) be pairs of source code snippets across the base and target programming languages that provide similar or corresponding functionality. Accordingly, in some implementations, techniques such as Cycle-GAN may be employed to jointly train one or more generators of one or more GANs to translate source code between the base and target programming languages. By employing such techniques, it is not required to have functionally-correspondent pairs of source code snippets in the base and target programming languages.

The individual machine learning models used for the generators and/or discriminators may take various forms. In some implementations, one or both of the generator and discriminator may take the form of a recurrent neural network, such as a long short-term memory ("LSTM") or gated recurrent unit ("GRU") network. In some implementations, one or both of the generator and discriminator may take the form of a sequence-to-sequence machine learning model, such as an encoder-decoder, or "autoencoder." In some such implementations, the encoder-decoder may include an encoder trained to generate a latent space embedding based on a source code snippet written in the source programming language. The encoder may be coupled with, for instance, a decoder trained to generate, from a latent space embedding, data indicative of a source code snippet (e.g., source code itself, an abstract syntax tree or "AST," etc.) written in the target programming language. In some implementations, one or both of the generator and discriminator may operate on graphical input, and may take the form of, for instance, a graph neural network ("GNN"), a graph convolutional network ("GCN"), a graph attention neural network ("GANN," not to be confused with "GAN," or generative adversarial network), and so forth.

Once the GAN(s) are trained, in some implementations, the inference stage may proceed as follows. A source code snippet programmed in a base programming language (e.g., C++) may be processed (e.g., compiled) to generate a first "low-level representation." As used herein, a "low level representation" may refer to bytecode, object code, binary code, assembly code, or any other representation of source code that is less human-readable than source code from which the low-level representation was generated. The first low-level representation may then be processed (e.g., decompiled) to generate a "machine-friendly," or "unnaturalistic" source code snippet in a target programming language (e.g., Java). As used herein, a "machine-friendly" or "unnaturalistic" source code snippet is a snippet that would be relatively unintelligible to a human because it is generated by a computer from a low-level representation, and lacks any style or other elements or traits (e.g., formatting, tabs, comments, etc.) that make it intelligible to humans.

The unnaturalistic source code snippet in the target programming language, and in some implementations, the original source code snippet programmed in the base programming language, may be applied as input across a target programming language generator to generate a "human-friendly" or "synthetically-naturalistic" source code snippet in the target programming language. As used herein, a "human-friendly" or "synthetically-naturalistic" source code snippet would be relatively intelligible to a human, especially compared to a machine-friendly or unnaturalistic source code snippet, because it may include style or other elements/traits that make it intelligible to humans.

In various implementations, the synthetically-naturalistic source code snippet in the target programming language may be rendered as output, e.g., of a software development application. Thus, for instance, a user who is unfamiliar with C++ but is familiar with Java may select a C++ source code file to cause all or a portion of that C++ source code file to be translated to, and displayed in, naturalistic-appearing Java source code.

In some implementations, a method implemented using one or more processors may include: processing a source code snippet programmed in a base programming language to generate a first low-level representation; processing the first low-level representation to generate an unnaturalistic source code snippet in a target programming language; applying the unnaturalistic source code snippet in the target programming language as input across a target programming language generator to generate a synthetically-naturalistic source code snippet in the target programming language; applying the synthetically-naturalistic source code snippet in the target language as input across a target programming language discriminator to generate output classifying the synthetically-naturalistic source code snippet as being synthetic or human-generated; and training one or both of the target programming language discriminator and the target programming language generator based on an adversarial loss of the output of the target programming language discriminator.

In various implementations, the source code snippet programmed in the base programming language is also applied as input across the target language generator along with the unnaturalistic source code snippet in the target programming language. In various implementations, the method may further include: applying the synthetically-naturalistic source code snippet in the target programming language as input across a base programming language generator to generate a synthetically-naturalistic source code snippet in the base programming language; applying the synthetically-naturalistic source code snippet in the base programming language as input across a base programming language discriminator to generate output classifying the synthetically-naturalistic source code snippet in the base programming language as being synthetic or human-generated; and training one or both of the base programming language discriminator and the base programming language generator based on an adversarial loss of the output of the base programming language discriminator.

In various implementations, the method may further include: compiling the synthetically-naturalistic source code snippet in the target programming language into a second low-level representation; and decompiling the second low-level representation to generate an unnaturalistic source code snippet in the base programming language. In various implementations, the unnaturalistic source code snippet in the base programming language is also applied as input across the base programming language generator along with the synthetically-naturalistic source code snippet in the target programming language.

In various implementations, one or both of the base programming language discriminator and the base programming language generator are further trained based on a similarity between the source code snippet programmed in the base programming language and the synthetically-naturalistic source code snippet in the base programming language. In various implementations, the similarity comprises an edit distance.

In various implementations, the first low-level representation comprises object code or bytecode.

In another aspect, a method may include: processing a source code snippet programmed in a base programming language to generate a first low-level representation; processing the first low-level representation to generate an unnaturalistic source code snippet in a target programming language; applying the unnaturalistic source code snippet in the target programming language and the source code snippet programmed in the base programming language as input across a target programming language generator to generate a synthetically-naturalistic source code snippet in the target programming language; and rendering, as output of a software development application, the synthetically-naturalistic source code snippet in the target programming language.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
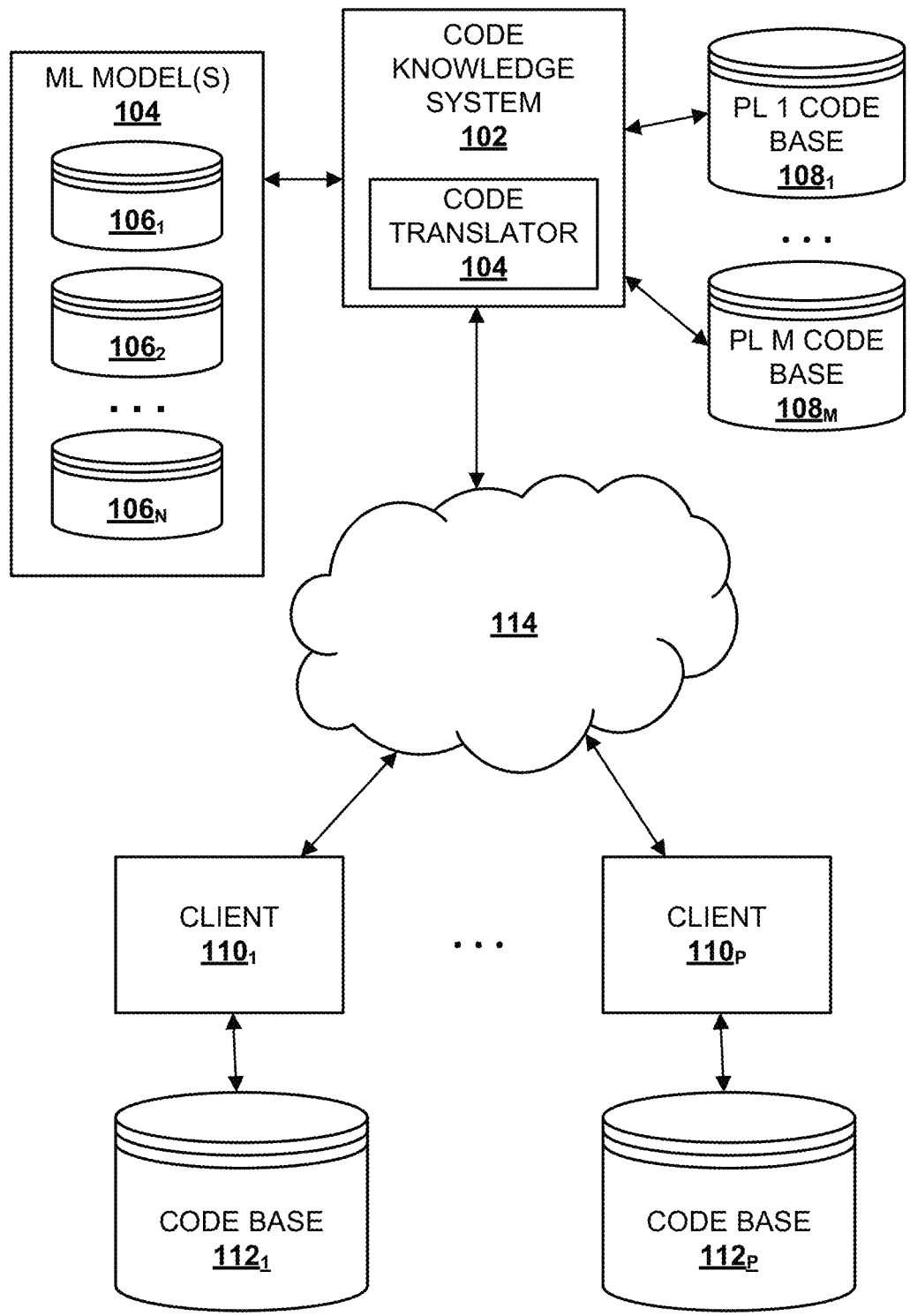
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be provided for helping clients $110_{1-P}$ manage their respective code bases $112_{1-P}$. Code knowledge system 102 may include, among other things, a code translator 104 that is configured to perform selected aspects of the present disclosure in order to help one or more clients $110_{1-P}$ to manage and/or make changes to one or more corresponding code bases $112_{1-P}$. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth.

Code translator 104 may be configured to leverage knowledge of multiple different programming languages in order to aid clients $110_{1-P}$ in translating between programming languages when editing, updating, replatforming, migrating, or otherwise acting upon their code bases $112_{1-P}$. For example, code translator 104 may be configured to translate code snippets from one programming language to another, e.g., on the fly, so that a developer fluent in a first programming language can view and/or edit source code that was originally written in a second, less-familiar programming language in the first programming language.

In various implementations, code knowledge system 102 may include a machine learning ("ML" in FIG. 1) database 104 that includes data indicative of one or more trained machine learning models $106_{1-N}$. These trained machine learning models $106_{1-N}$ may take various forms that will be described in more detail below, including but not limited to generative adversarial network ("GAN") components such as discriminators and/or generators, a graph-based network such as a graph neural network ("GNN"), graph attention neural network ("GANN"), or graph convolutional neural network ("GCN"), a sequence-to-sequence model such as an encoder-decoder, various flavors of a recurrent neural network ("RNN", e.g., long short-term memory, or "LSTM", gate recurrent units, or "GRU", etc.), and any other type of machine learning model that may be applied to facilitate selected aspects of the present disclosure.

In some implementations, code knowledge system 102 may also have access to one or more programming-language-specific code bases $108_{1-M}$. In some implementations, these programming-language-specific code bases $108_{1-M}$ may be used, for instance, to train one or more of the machine learning models $106_{1-N}$. In some such implementations, and as will be described in further detail below, the programming-language-specific code bases $108_{1-M}$ may be used in combination with other data to train machine learning models $106_{1-N}$, such as other programming-language-specific code bases 108 to jointly learn transformations between programming languages.

In various implementations, a client 110 that wishes to enable manipulation of its code base 112 in programming language(s) other than that/those used originally to write the source code may establish a relationship with an entity (not depicted in FIG. 1) that hosts code knowledge system 102. When a developer wishes to view/edit a source code snippet of the entity's code base 112 but is unfamiliar with the native programming language, code translator 104 may provide a version of the source code snippet that is translated to a target programming language preferred by the developer. In some such implementation, code translator 104 may generate the translated source code snippet on the fly, e.g., in real time. In other implementations, code translator 104 may operate, e.g., in a batch mode, to preemptively translate all or selection portions of an entity's code base 112 into a targeted programming language. In some implementations in which the developer then edits the translated source code snippet, the edited version may be translated back into the native programming language or left in the new, target programming language, assuming other necessary infrastructure is in place.

Figure 2:
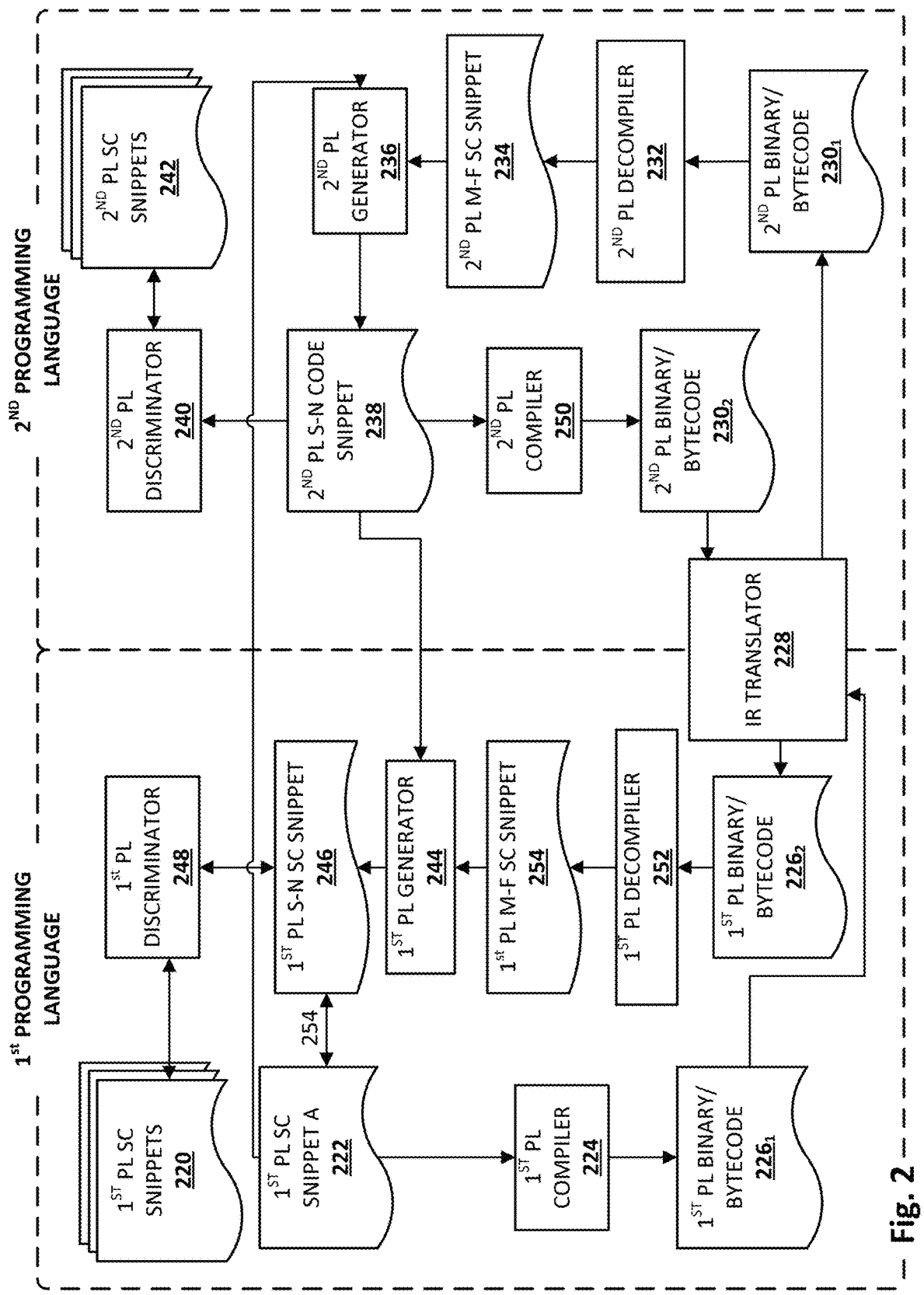
FIG. 2 is a block diagram showing an example of how components of generative adversarial networks may be trained, in accordance with various implementations.

FIG. 2 is a block diagram of an example process flow that may be implemented in whole or in part by code knowledge system 102 during training of machine learning models $106_{1-N}$. Once trained, these models facilitate translation between a first programming language (left in FIG. 2) and a second programming language (right in FIG. 2). Various components depicted in FIG. 2 may be implemented by code knowledge system 102, e.g., as code translator 104, or separately from code knowledge system 102.

Beginning at the top left, a code base of first programming language source code ("1$^{st}$ PL SC" in FIG. 2) snippets 220 may include a number of source code files, libraries, etc., that include samples of source code written by human(s) in the first programming language. Likewise, at top right, a code base of second programming language source code ("2$^{nd}$ PL SC" in FIG. 2) snippets 220 may include a number of source code files, libraries, etc., that include samples of source code written by human(s) in the second programming language.

During training, a particular first programming language snippet A 222 that was written by a human developer may be obtained, e.g., from code base 220 or from another source. This particular first programming language snippet A 222 may be processed to generate a first "low level representation" of the particular first programming language snippet A 222. This low level representation may take various forms, such as object or binary code, bytecode, or any other form that is "beneath" human-written source code in the software development stack. In FIG. 2, for instance, the particular first programming language snippet A 222 is compiled using a first programming language compiler 224 into a first programming language binary and/or bytecode $226_1$.

In some implementations, first programming language binary and/or bytecode $226_1$ may be translated, e.g., by an intermediate representation ("IR") translator 228, into second programming language binary and/or bytecode $230_1$. In other implementations, IR translator 228 may include a "built-in" compiler that translates first programming language source code snippet A 222 directly into second programming language binary and/or bytecode $230_1$. In such implementations, first programming language compiler 224 may be omitted and/or incorporated into IR translator 228. For example, IR translator may take the form of a low level Java Virtual Machine ("LLJVM") that converts, for instance, C or C++ code (e.g., 222) into bytecode (e.g., $230_1$) that is executable by a Java Virtual Machine ("JVM").

At any rate, once second programming language binary/bytecode $230_1$ is generated, it may be processed, e.g., by a second programming language decompiler 232, to generate a second programming language "machine-friendly" ("MF" in FIG. 2) or "unnaturalistic" source code snippet 234. Second programming language machine-friendly source code snippet 234 may be an accurate and/or functional version of source code in the second programming language. It may obey various syntactical and/or other constraints associated with the second programming language. However, second programming language machine-friendly source code snippet 234 may be difficult for a human being (e.g., a developer) to read because it is machine-generated. Hence, it is described herein as "machine-friendly" because it may be "unnaturalistic" to a point that a human developer cannot comprehend it, at least efficiently.

In some implementations, second programming language machine-friendly source code snippet 234 may be applied as input across a second programming language generator 236. Second programming language generator 236 may be a machine learning model that can take various forms, such as a GNN, GANN, GCN, sequence-to-sequence model, RNN, LSTM, GRU, etc. In some implementations, second programming language generator 236 may also receive, as input, first programming language source code snippet A 222, which may be applied as input alongside second programming language machine-friendly source code snippet 234. Consequently, during training second programming language generator 236 effectively "learns" to act as a vocabulary and/or style "extractor."

The output of second programming language generator 236 may be data indicative of a second programming language "synthetically-naturalistic" source code snippet 238. Second programming language synthetically-naturalistic source code snippet 238 (and other similar snippets in FIG. 2, such as 246) is so-named because it is intended to be "human-friendly" or "human-readable," i.e., readily comprehensible by a human developer. For example, assuming second programming language generator 236 is sufficiently trained, its output should include style and/or vocabulary extracted from first programming language source code snippet A 222 and/or from previous training instances in which other source code snippets 220 were used. Generally, "data indicative of" a source code snippet may refer to the source code snippet itself, or another representation of the source code, such as an abstract syntax tree ("AST"), a latent space embedding, etc.

However, in order to train second programming language generator 236 to ensure that its output would be understandable by a human versed in the second programming language, a second programming language discriminator 240 may be provided. Second programming language discriminator 240 may be trained to generate output classifying the second programming language synthetically-naturalistic source code snippet 238 as being synthetic or human-generated. In various implementations, second programming language discriminator 240 may be trained in part using the corpus or codebase 242 of second programming language source code snippets. For example, during training, second programming language discriminator 240 may be alternatively trained using "ground truth" second programming language source code snippets 242 and "synthetic" source code snippets in the form of second programming language synthetically-naturalistic source code snippet 238.

Second programming language discriminator 240 and/or second programming language generator 236 may be trained based on an adversarial loss of the output of second programming language discriminator 240. Suppose output of second programming language discriminator 240 correctly classifies an input snippet 238 as being synthetic. This is an example of second programming language generator 236 failing to "fool" second programming language discriminator 240. This may serve as a positive (or at least neutral) training example for second programming language discriminator 240, while serving as a negative training example for second programming language generator 236.

As another example, suppose output of second programming language discriminator 240 incorrectly classifies an input snippet 238 as being genuine, when in fact it was synthetically-generated by second programming language generator 236. This is an example of second programming language generator 236 successfully "fooling" second programming language discriminator 240. Consequently, this may be a negative training example for second programming language discriminator 240, and in some instances may be used as a positive training example for second programming language generator 236.

As yet another example, suppose output of second programming language discriminator 240 incorrectly classifies a "ground truth" or "genuine" second programming language source code snippet (e.g., from 242) as "synthetic." This may be used as a negative training example for second programming language discriminator 240. Generally, when machine learning models are described herein as being "trained," it should be understood that various techniques may be used to train these models as applicable, such as the aforementioned gradient descent, back propagation, etc.

With the components depicted in FIG. 2, in some implementations, it is possible to also train one or more machine learning models to translate from the second programming language into the first programming language. In some such instances, these components may be implemented as a CycleGAN so that there is no need for code snippets in either language to be precisely paired with similar-functionality code snippets in the other language. Moreover, CycleGAN may enable large-scale unsupervised training because both source code corpuses 220 and 242 (which may be huge) can be used as training examples as described herein.

For example, in some implementations, second programming language synthetically-naturalistic source code snippet(s) 238 may be reused to train additional GAN components associated with the first programming language, such as a first programming language generator 244 and/or a first programming language discriminator 248. In FIG. 2, second programming language synthetically-naturalistic source code snippet 238 is processed, e.g., by a second programming language compiler 250, into another low level representation, which in FIG. 2 takes the form of second programming language binary and/or bytecode $230_2$. This second programming language binary and/or bytecode $230_2$ may be translated, e.g., by IR translator 228, into first programming language binary and/or bytecode $226_2$. First language binary and/or bytecode $226_2$ may then be processed, e.g., by a first programming language decompiler 252, into a first programming language machine-friendly (or unnaturalistic) source code snippet 254.

Similar to the input of second programming language generator 236, in FIG. 2, both first programming language machine-friendly source code snippet 254 and second programming language synthetically-naturalistic source code snippet 238 (serving a similar role as first programming language source code snippet A 222 in previous examples) may be applied as input across first programming language generator 244. First programming language generator 244 may generate output that is indicative of a first programming language synthetically-naturalistic source code snippet 246.

Similar as the example pertaining to the second programming language, first programming language synthetically-naturalistic source code snippet 246 may be applied as input across first programming language discriminator 248 to generate output. That output may classify the first programming language synthetically-naturalistic source code snippet 246 as being synthetic or human-generated. As before, one or both of first programming language discriminator 248 and first programming language generator 244 may be trained based on an adversarial loss of the output of first programming language discriminator 248.

In some implementations, first programming language discriminator 248 and/or first programming language generator 244 may be further trained based on a similarity between first programming language source code snippet A 222 and first programming language synthetically-naturalistic source code snippet 246. In some cases this similarity may be referred to as a cycle consistency loss or recovery loss 254. Cycle consistency loss or recovery loss 254 may be determined in various ways. In some implementations, it may be determined based on an edit distance between first programming language source code snippet A 222 and first programming language synthetically-naturalistic source code snippet 246. In other implementations, it may be a distance between embeddings generated from 222, 246 in latent space. In yet other implementations it may take other forms.

The operations described above and depicted in FIG. 2 are not meant to be limiting. For example, they may be performed in the reverse. For example, a human-written second programming language source code snippet 242 may be used to train first programming language generator 244 and/or first programming language discriminator 248, instead of the second programming language synthetically-naturalistic source code snippet 238 generated by second programming language generator 238.

Once the GAN components in FIG. 2 are trained, they may be used for various purposes. For example, second programming language generator 236 may be used to translate a source code snippet (or data indicative of a source code snippet, such as a latent space embedding or AST) in the first programming language into a second programming language source code snippet. Similarly, first programming language generator 244 may be used to translate a source code snippet in the second programming language into a first programming language source code snippet. In some implementations, separate GANs may be trained for each pair of programming languages.

As noted previously, in some implementations, first programming language generator 244, first programming language discriminator 248, second programming language generator 236, and/or second programming language discriminator 240 may be implemented using machine learning models that operate on graph input. With GNNs, for example, the graph input may take the form of ASTs. Features (which may be manually selected or learned during training) may be extracted for each node of the AST to generate a feature vector for each node. Nodes of each AST may represent a variable, object, or other programming construct. Accordingly, features of the feature vectors generated for the nodes may include features such as variable type (e.g., int, float, string, pointer, etc.), name, operator(s) that act upon the variable as operands, etc. A feature vector for a node at any given point in time may be deemed that node's "state." Meanwhile, each edge of the AST may be assigned a machine learning model, e.g., a particular type of machine learning model or a particular machine learning model that is trained on particular data.

Then, for each time step of a series of time steps, feature vectors, or states, of each node may be propagated to their neighbor nodes along the edges/machine learning models, e.g., as projections into latent space. In some implementations, incoming node states to a given node at each time step may be summed (which is order-invariant), e.g., with each other and the current state of the given node. As more time steps elapse, a radius of neighbor nodes that impact a given node of the AST increases.

Intuitively, knowledge about neighbor nodes is incrementally "baked into" each node's state, with more knowledge about increasingly remote neighbors being accumulated in a given node's state as the machine learning model is iterated more and more. In some implementations, the "final" states for all the nodes of the AST may be reached after some desired number of iterations is performed. This number of iterations may be a hyper-parameter of the GNN. In some such implementations, these final states may be summed to yield an overall state or embedding of the AST.

When a generator (whether 236 or 244) is implemented using a GNN, the overall state or embedding of the AST may be applied as input across one or more additional machine learning models and/or other processing streams to generate synthetically-naturalistic source code. For example, an encoder-decoder network, or "autoencoder," may be trained so that an encoder portion generates a latent space embedding from an input AST or source code, and a decoder portion translates that latent space embedding back into the original input. Once such an encoder-decoder network is trained, the decoder portion may be separated and applied to the latent space embedding generated by the GNN used for the generator (e.g., 236, 244) to generate an AST and/or source code. In some implementations in which a discriminator (e.g., 240, 248) is implemented at least in part using a GNN, the GNN may be coupled with a prediction layer, e.g., a softmax layer or a sigmoid function layer, that outputs yes or no (or one or zero, or a probability) based on the latent space embedding generated by the discriminator.

Techniques described herein may be utilized to provide programmers, e.g., operating client devices $110_{1-P}$, with tools that facilitate translation between a source programming language and/or one or more target programming languages (and back again in many instance). These tools may be provided, for instance, as features or plugins associated with a software development tool. These tools may enable programmers to translate their source code to another programming language, or to see source code written in another, perhaps unfamiliar programming language in a target programming language in which they are trained to develop source code.

Figure 3:
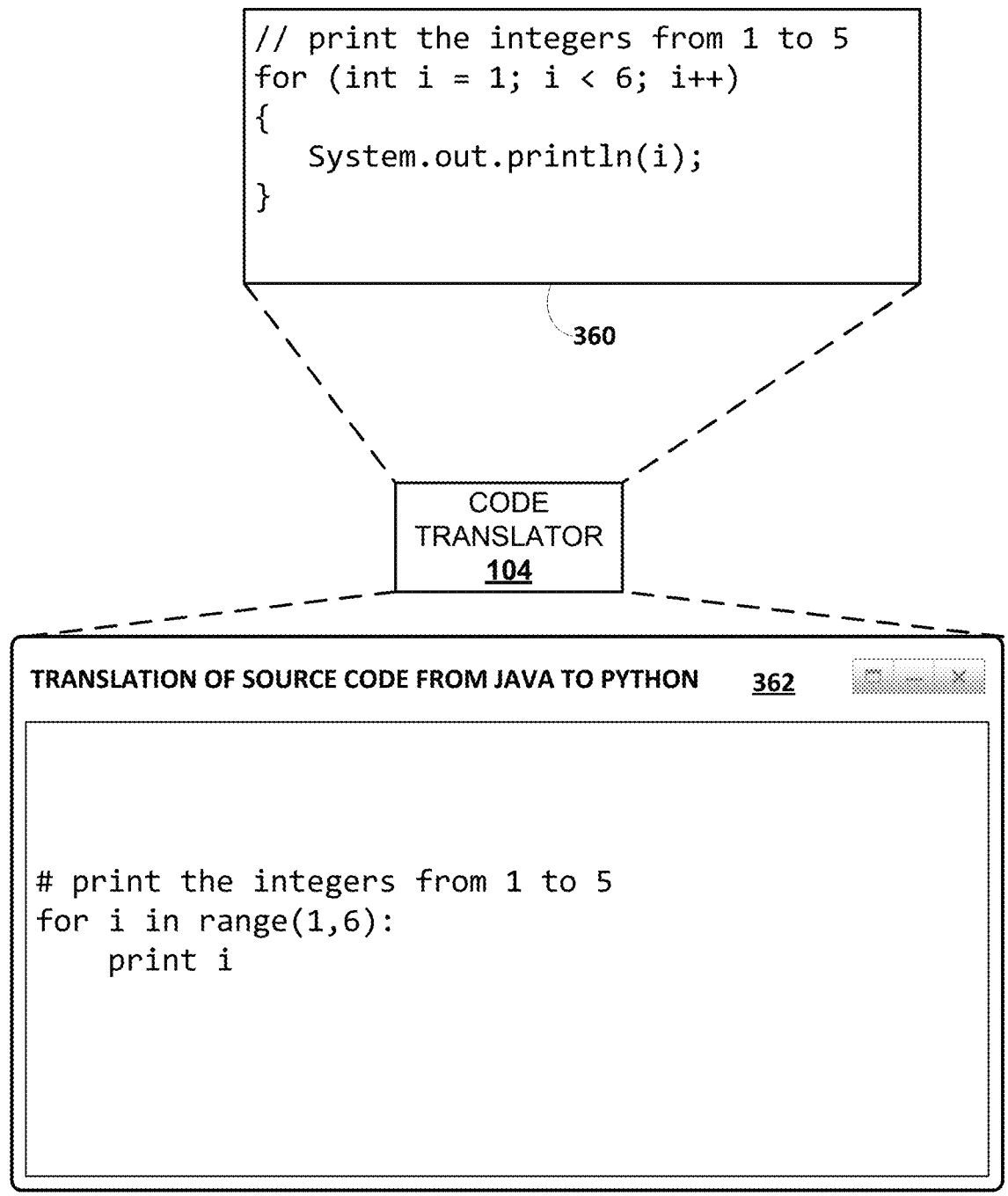
FIG. 3 depicts an example application of techniques described herein, in accordance with various implementations.

FIG. 3 depicts an example of how a code snippet written in one programming language may be translated to a synthetically-naturalistic code snippet rendered in another programming language. In this example, the base source code snippet 360 is written in Java and prints the integers one to five. At bottom, a graphical user interface ("GUI") 362 is depicted that may be presented to a developer who is unfamiliar with Java, but who has expertise in another programming language. In this example, the code snippet 360 written in Java is converted by code translator 104 into Python and rendered as part of GUI 362. In this way, the developer operating GUI 362 may view the source code in a programming language with which he or she is more familiar. In some cases, the developer may be able to edit the translated source code. In some such implementations, the edits made by the developer (i.e. to the Python code in FIG. 3) may be translated back to Java before being stored and/or more permanently incorporated into the code base. In other implementations, the edited Python code may be incorporated into the code base.

In some implementations, the original source code 360 may be sent to code knowledge system 102 for translation by code translator 104 prior to being sent to the computing device (not depicted) that renders GUI 362. In other implementations, GUI 362 may be part of a software development application that performs the programming language translation locally, e.g., using a plug in or built-in functionality. The scenario of FIG. 3 is for illustrative purposes only. Source code may be translated between programming languages using techniques described herein for any number of applications.

For example, suppose a first user who is trained in a base programming language sends a source code snippet in the base programming language to a second user, e.g., as an attachment or in the body of an email. In some implementations, the source code in the based programming language may be translated into a target programming language en route to the second user, e.g., by code translator 104. Additionally or alternatively, in some implementations, the second user's email application (or an email server that stores emails of the second user) may have a plugin configured with selected aspects of the present disclosure.

In some implementations, a single user may operate a software development application to view multiple different source code snippets written in multiple different programming languages that are unfamiliar to the user. In some such examples, multiple respective machine learning models (e.g., generators) may be used to translate the source code snippets from the multiple different programing languages to a language (or languages) that are better understood to the user.

In some implementations, techniques described herein may be used to automatically convert source code written in one programming language into source code in another programming language, without necessarily presenting translated source code to users as described previously. For example, a company may decide to replatform an existing code base 112 to a new programming language, e.g., to obtain new functionality that and/or technical benefits (e.g., security features, processing speed features, etc.) that were unavailable with the original programming language. Such a company may be able to deploy techniques described herein, or request that an entity associated with code knowledge system 102 deploy techniques described herein, to automatically convert all or a portion of a code base 112 from one programming language to another.

Figure 4:
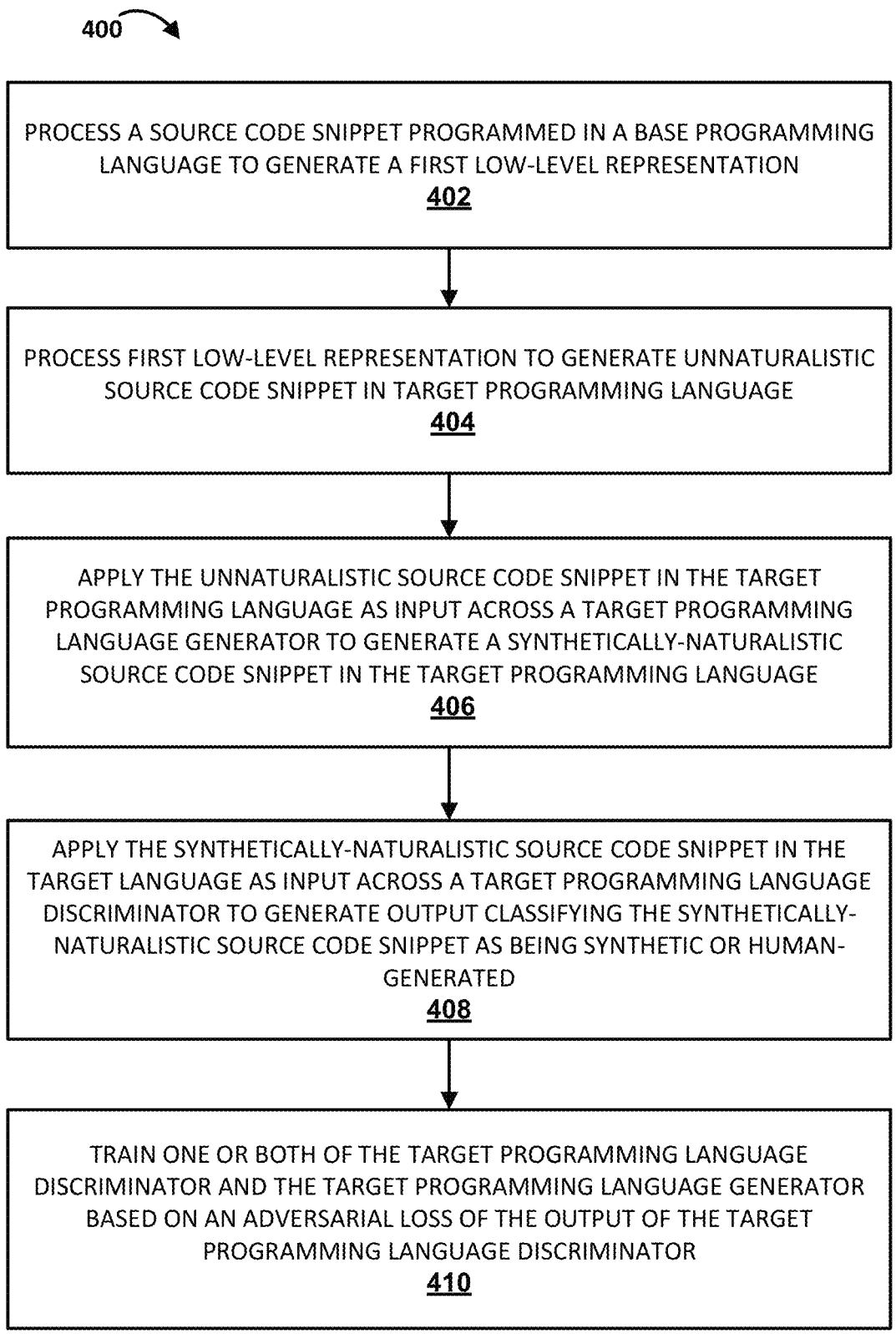
FIG. 4 depicts a flowchart illustrating an example method for practicing selected aspects of the present disclosure.

FIG. 4 is a flowchart illustrating an example method 400 of training various GAN components to translate between two programming languages, in accordance with implementations disclosed herein. For convenience, the operations of the flow chart are described with reference to a system that performs the operations. This system may include various components of various computer systems, such as one or more components of code knowledge system 102. Moreover, while operations of method 400 are shown in a particular order, this is not meant to be limiting. One or more operations may be reordered, omitted or added.

At block 402, the system may process a source code snippet programmed in a base programming language (e.g., C, C++) to generate a first low-level representation (e.g., bytecode and/or binary/object code, a latent space embedding, etc.). For example, in FIG. 2, first programming language compiler 224 compiles first programming language source code snippet A 222 into first programming language binary/bytecode $226_1$. In some cases, first programming language binary/bytecode $226_1$ may then be translated, e.g., by IR translator 228, into second programming language binary/bytecode $230_1$. Additionally or alternatively, in some implementations in which IR translator 228 has and/or is a compiler (e.g., LLJVM), IR translator 228 may process first programming language source code snippet A 222 directly into second programming language binary/bytecode $230_1$.

At block 404, the system may decompile or otherwise process the first low-level representation to generate an unnaturalistic source code snippet (e.g., in a target programming language). For example, in FIG. 2, second programming language decompiler 232 decompiles second programming language binary/bytecode $230_1$ to generate second programming language machine-friendly source code snippet 234.

At block 406, the system may apply the unnaturalistic source code snippet in the target programming language as input across a target programming language generator to generate a synthetically-naturalistic source code snippet in the target programming language. For example, in FIG. 2, second programming language machine-friendly source code snippet 234 is applied as input across second programming language generator 236. In some implementations, the source code snippet programmed in the base programming language is also applied as input across the target language generator along with the unnaturalistic source code snippet in the target programming language. In FIG. 2, both elements 234 and 222 are applied as input across second programming language generator 236 to generate second programming language synthetically-naturalistic source code snippet 238.

At block 408, the system may apply the synthetically-naturalistic source code snippet in the target language as input across a target programming language discriminator to generate output classifying the synthetically-naturalistic source code snippet as being synthetic or human-generated. In FIG. 2, for instance, second programming language synthetically-naturalistic source code snippet 238 is applied as input across second programming language discriminator 240 to generate output classifying the second programming language synthetically-naturalistic source code snippet 238 as either being synthetic (machine generated) or genuine (human-generated). In some implementations, second programming language discriminator 240, or other discriminators described herein, may also generate output that indicates whether input (e.g., second programming language synthetically-naturalistic source code snippet 238) conforms with a programming language "style" or language intrinsics of a given programming language.

At block 410, the system may train one or both of the target programming language discriminator and the target programming language generator based on an adversarial loss of the output of the target programming language discriminator. For example, in FIG. 2, one or both of the second programming language discriminator 240 and/or the second programming language generator 236 is trained based on the correctness or incorrectness of the classification output by second programming language generator 240.

As was described previously with respect to FIG. 2, similar operations as those depicted in FIG. 4 may performed to train first programming language generator 244 and/or first programming language discriminator 248. Moreover, in some implementations, first programming language synthetically-naturalistic source code snippet 246 may be applied, e.g., along with second programming language machine-friendly source code snippet 234, as input across second programming language generator 236 for training purposes (this is in addition to or instead of the combination of elements 222 and 234 being used to train 236).

Figure 5:
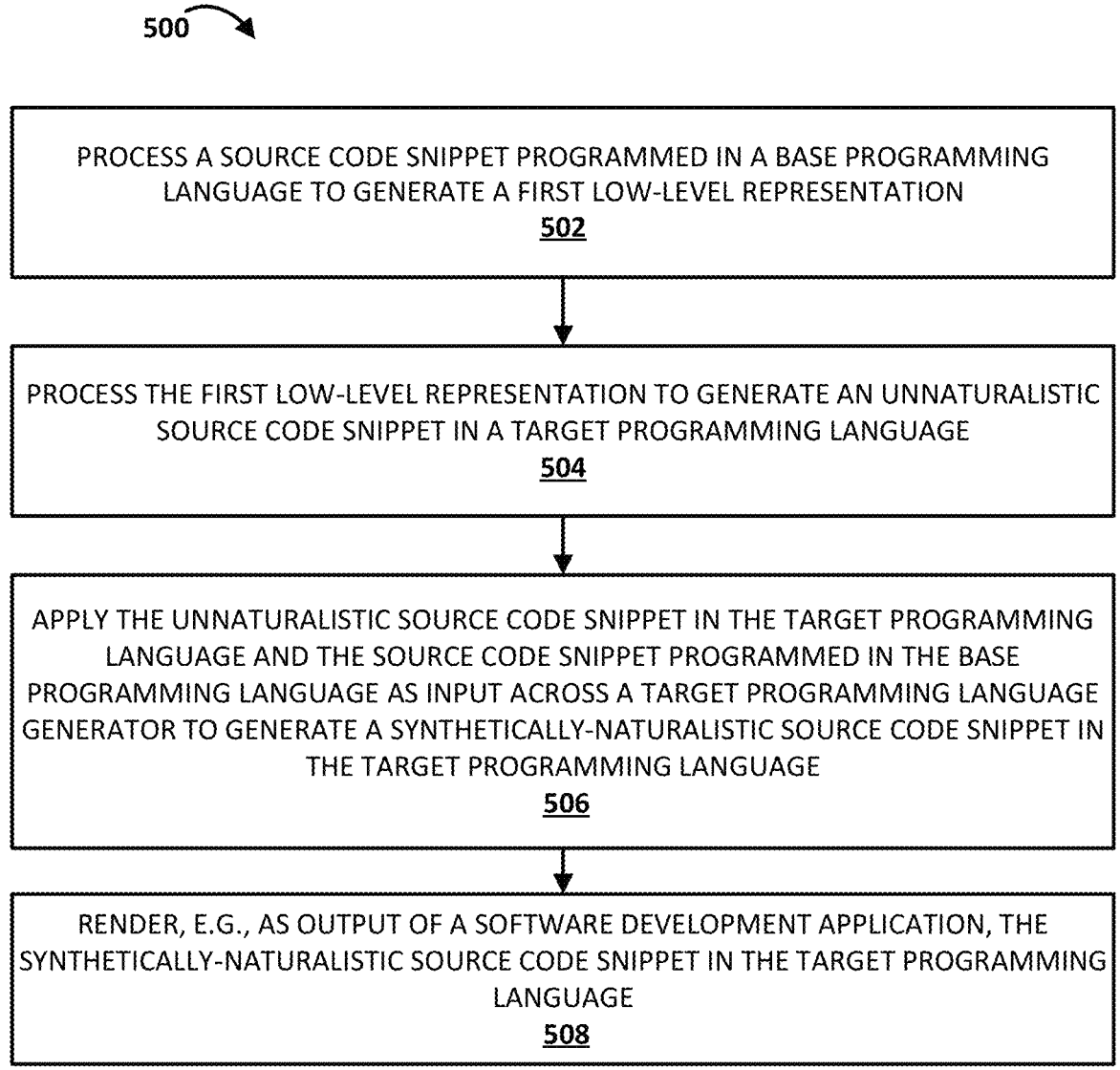
FIG. 5 depicts another flowchart illustrating an example method for practicing selected aspects of the present disclosure.

FIG. 5 is a flowchart illustrating an example method 500 of making inferences using GAN machine learning models trained using techniques such as those described with respect to FIG. 4, in accordance with implementations disclosed herein. For convenience, the operations of the flow chart are described with reference to a system that performs the operations. This system may include various components of various computer systems, such as one or more components of code knowledge system 102. Moreover, while operations of method 500 are shown in a particular order, this is not meant to be limiting. One or more operations may be reordered, omitted or added.

At block 502, the system may process a source code snippet programmed in a base programming language to generate a first low-level representation. For example, a first programming source code snippet may be compiled by first programming language compiler 224 to generate first programming language binary/bytecode 226₁, which may be translated IR translator 228 to generate second programming language binary/bytecode 230₁. Alternatively, IR translator 228 may directly process the first programming language snippet to generate second programming language binary/bytecode 230₁.

At block 504, the system may process, e.g., decompile, the first low-level representation to generate an unnaturalistic or "machine-friendly" source code snippet in a target programming language. For example, second programming language decompiler 232 may decompile second programming language binary/bytecode 230₁ to generate second programming language machine-friendly source code snippet 234.

At block 506, the system may apply the unnaturalistic source code snippet in the target programming language and the source code snippet programmed in the base programming language as input across a target programming language generator to generate a synthetically-naturalistic source code snippet in the target programming language. For example, the first programming language snippet 222 and second programming language machine-friendly source code snippet 234 may be applied as input across second programming language generator 236. In some implementations, during inference, the original first programming language snippet (that is to be translated to the second programming language) might be omitted, so that only the second programming language machine-friendly source code snippet 234 is applied across second programming language generator 236. The output of second programming language generator 236 may be second programming language synthetically-naturalistic source code snippet 238.

At block 508, the system may render, e.g., as output of a software development application, the synthetically-naturalistic source code snippet in the target programming language. For example, and as shown in FIG. 3, second programming language synthetically-naturalistic source code snippet 238 may be rendered, in whole or in part, in a GUI associated with a software development application, e.g., executing on a client's computing system 110.

Figure 6:
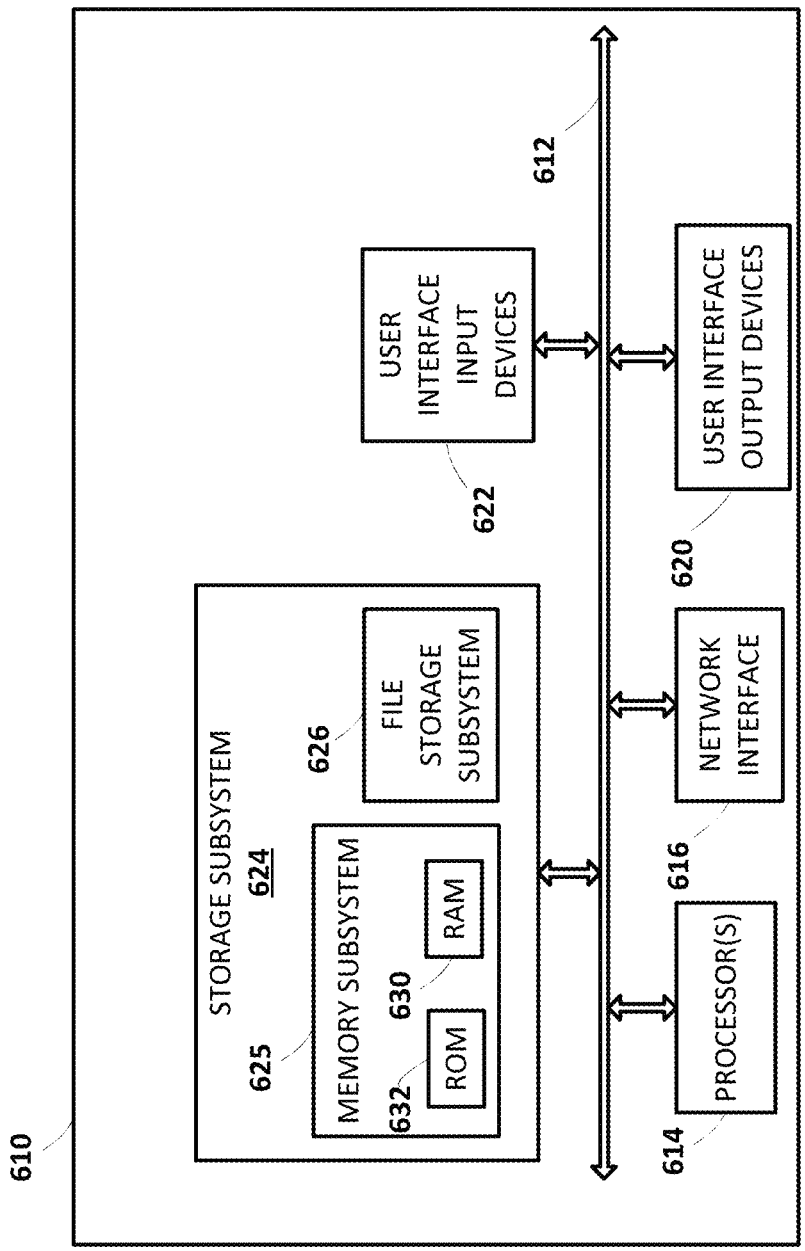
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIGS. 4-5, as well as to implement various components depicted in FIGS. 1-2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
processing a source code snippet programmed in a base programming language to generate a first low-level representation, wherein the source code snippet includes at least some stylistic visual formatting elements;
decompiling the first low-level representation to generate a first compilable source code snippet in a target programming language, wherein the first compilable source code snippet in the target programming language lacks the stylistic visual formatting elements;
applying the first compilable source code snippet in the target programming language as input across a target programming language generator to generate a synthetic compilable source code snippet in the same target programming language, wherein the synthetic compilable source code snippet includes at least some of the stylistic visual formatting elements that were extracted from the source code snippet in the base programming language and absent from the first compilable source code snippet;
applying the synthetic compilable source code snippet in the target programming language as input across a target programming language discriminator to generate output classifying the synthetic compilable source code snippet as being synthetic or human-generated; and
training the target programming language generator based on an adversarial loss of the output of the target programming language discriminator wherein the target programming language is applied to subsequent source code snippets programmed in the base programming language to generate output that includes stylistic visual formatting elements extracted from the subsequent source code snippets programmed in the base programming language.

2. The method of claim 1, wherein the source code snippet programmed in the base programming language is also applied as input across the target programming language generator along with the first compilable source code snippet in the target programming language.

3. The method of claim 1, further comprising:
applying the synthetic compilable source code snippet in the target programming language as input across a base programming language generator to generate a synthetic compilable source code snippet in the base programming language;
applying the synthetic compilable source code snippet in the base programming language as input across a base programming language discriminator to generate output classifying the synthetic compilable source code snippet in the base programming language as being synthetic or human-generated; and
training one or both of the base programming language discriminator and the base programming language generator based on an adversarial loss of the output of the base programming language discriminator.

4. The method of claim 3, further comprising:
compiling the synthetic compilable source code snippet in the target programming language into a second low-level representation; and
decompiling the second low-level representation to generate a second compilable source code snippet in the base programming language;
wherein the second compilable source code snippet in the base programming language is also applied as input across the base programming language generator along with the synthetic compilable source code snippet in the target programming language.

5. The method of claim 3, wherein one or both of the base programming language discriminator and the base programming language generator are further trained based on a similarity between the source code snippet programmed in the base programming language and the synthetic compilable source code snippet in the base programming language.

6. The method of claim 5, wherein the similarity comprises an edit distance.

7. The method of claim 1, wherein the first low-level representation comprises object code.

8. The method of claim 1, wherein the first low-level representation comprises bytecode.

9. A method implemented using one or more processors, comprising:
processing a source code snippet programmed in a base programming language to generate a first low-level representation, wherein the source code snippet includes at least some stylistic visual formatting elements;
decompiling the first low-level representation to generate a first compilable source code snippet in a target programming language, wherein the first compilable source code snippet in the target programming language lacks the stylistic visual formatting elements;
applying the first compilable source code snippet in the target programming language and the source code snippet programmed in the base programming language as input across a target programming language generator to extract at least some of the stylistic visual formatting elements from the source code snippet in programmed in the base programming language and generate a synthetic compilable source code snippet in the same target programming language, wherein the synthetic compilable source code snippet includes at least some of the visual formatting elements that were extracted from the source code snippet programmed in the base programming language and that were absent from the first compilable source code snippet, wherein the target programming language generator was jointly trained with a target programming language discriminator based on an adversarial loss to generate output that includes stylistic visual formatting elements extracted from source code programmed in the base programming language; and rendering, as output of a software development application, the synthetic compilable source code snippet in the target programming language.

10. The method of claim 9, wherein the first low-level representation comprises object code.

11. The method of claim 9, wherein the first low-level representation comprises bytecode.

12. A system comprising one or more processors and memory storing instructions that, in response to execution of the instructions by the one or more processors, cause the one or more processors to:

process a source code snippet programmed in a base programming language to generate a first low-level representation, wherein the source code snippet includes at least some stylistic visual formatting elements;

process the first low-level representation to generate a first compilable source code snippet in a target programming language, wherein the first compilable source code snippet in the target programming language lacks the stylistic visual formatting elements;

apply the first compilable source code snippet in the target programming language as input across a target programming language generator to generate a synthetic compilable source code snippet in the same target programming language, wherein the synthetic compilable source code snippet includes at least some of the stylistic visual formatting elements that were extracted from the source code snippet in the base programming language and absent from the first compilable source code snippet;

apply the synthetic compilable source code snippet in the target programming language as input across a target programming language discriminator to generate output classifying the synthetic compilable source code snippet as being synthetic or human-generated; and train the target programming language generator based on an adversarial loss of the output of the target programming language discriminator wherein the target programming language is applied to subsequent source code snippets programmed in the base programming language to generate output that includes stylistic visual formatting elements extracted from the subsequent source code snippets programmed in the base programming language.

13. The system of claim 12, wherein the source code snippet programmed in the base programming language is also applied as input across the target programming language generator along with the first compilable source code snippet in the target programming language.

14. The system of claim 12, further comprising instructions to:

apply the synthetic compilable source code snippet in the target programming language as input across a base programming language generator to generate a synthetic compilable source code snippet in the base programming language;

apply the synthetic compilable source code snippet in the base programming language as input across a base programming language discriminator to generate output classifying the synthetic compilable source code snippet in the base programming language as being synthetic or human-generated; and train one or both of the base programming language discriminator and the base programming language generator based on an adversarial loss of the output of the base programming language discriminator.

15. The system of claim 14, further comprising instructions to:

process the synthetic compilable source code snippet in the target programming language into a second low-level representation; and process the second low-level representation to generate a second compilable source code snippet in the base programming language;

wherein the second compilable source code snippet in the base programming language is also applied as input across the base programming language generator along with the synthetic compilable source code snippet in the target programming language.

16. The system of claim 14, wherein one or both of the base programming language discriminator and the base programming language generator are further trained based on a similarity between the source code snippet programmed in the base programming language and the synthetic compilable source code snippet in the base programming language.

17. The system of claim 16, wherein the similarity comprises an edit distance.

18. The system of claim 12, wherein the first low-level representation comprises object code.

19. The system of claim 12, wherein the first low-level representation comprises bytecode.

* * * * *